Patented June 30, 1931

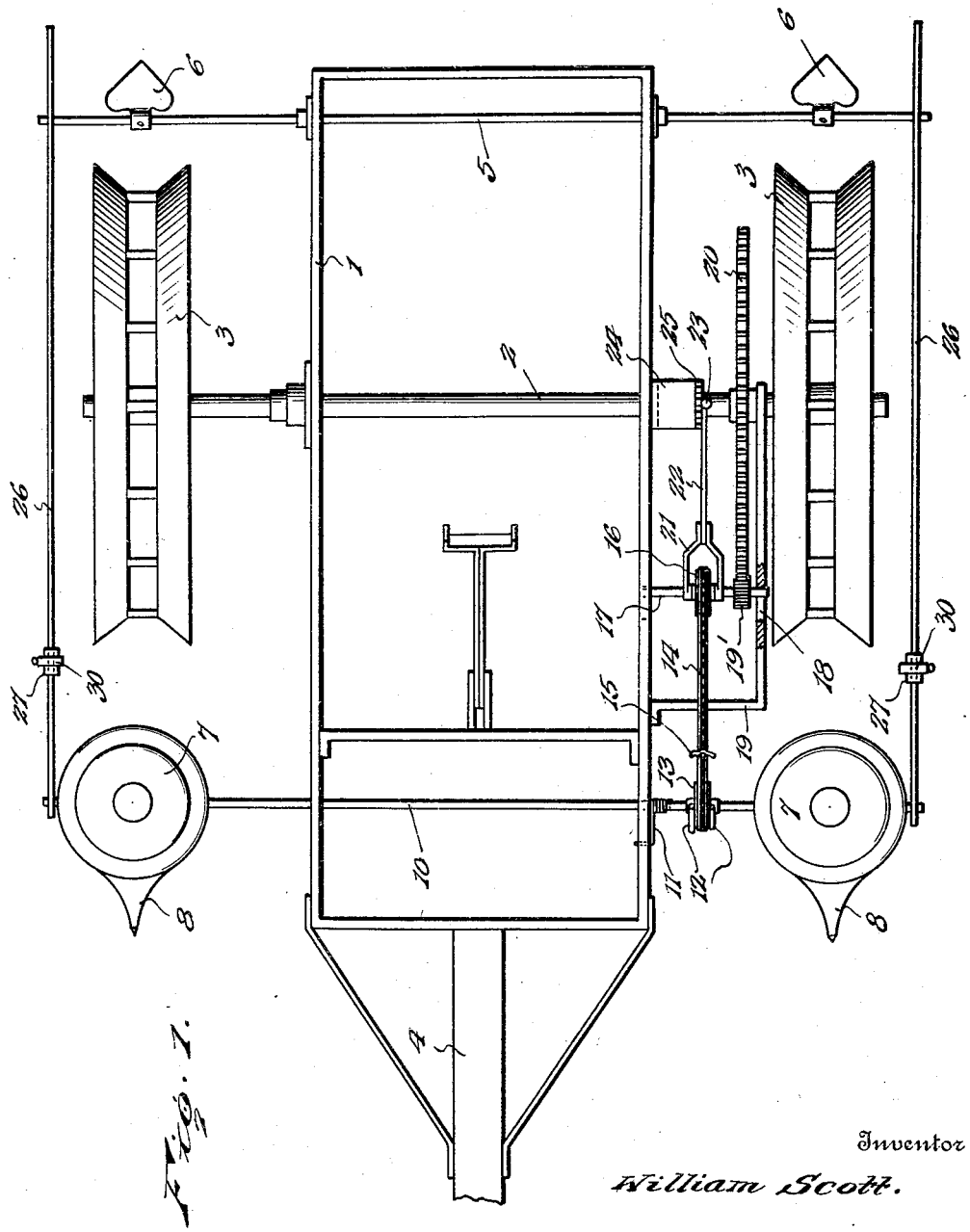

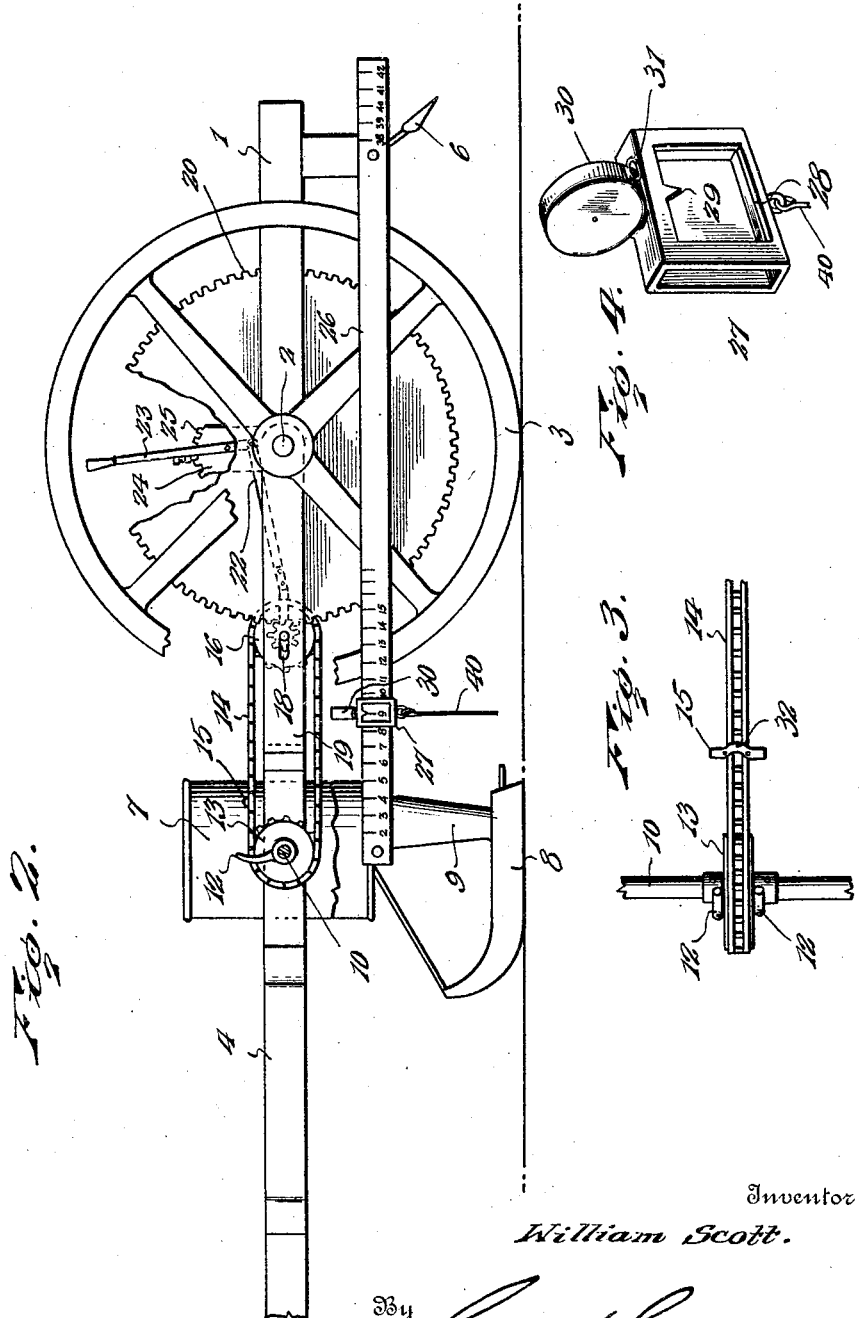

1,811,973

UNITED STATES PATENT OFFICE

WILLIAM SCOTT, OF MOUNT VERNON, OHIO

CHECK ROWER

Application filed December 28, 1928. Serial No. 329,014.

This invention has for its object the provision of a very simple and inexpensive mechanism whereby hills of corn or other seed may be planted at equal and regular intervals without the use of the expensive and cumbersome check row wire stretching from side to side of the field. The invention provides a very simple mechanism driven by the ground wheels of the planter and actuating the dropping shaft at regular intervals to plant the hills. The invention also provides a measuring gage whereby the planter may be easily and accurately set when about to start a return trip so that the hills planted on the return trip will aline properly with the previously planted hills, all of which is illustrated in the accompanying drawings and will be hereinafter first fully described and then more particularly defined in the claim.

In the drawings:

Figure 1 is a plan view of so much of a planter as is necessary to an understanding of the present invention, Fig. 2 is a side elevation, partly broken away, of the same, Fig. 3 is an enlarged detail plan view of the tripping mechanism whereby the dropper shaft is actuated, and Fig. 4 is an enlarged detail perspective view of the slidable gage.

The frame of the corn planter, indicated conventionally at 1, may be of any approved form and is mounted upon an axle 2 carrying ground wheels 3 whereby the machine may be easily moved over the field and the rotation of the ground wheels utilized to drive the check rower. A draft tongue 4 is attached to the front end of the frame 1 and it is, of course, equipped with a driver's seat which, however, has been omitted in order that the other parts may be more clearly shown. A scraper rod 5 is mounted in the rear end of the frame 1 and carries scrapers 6 which may be rocked into position to engage the peripheries of the ground wheels 3 when necessary to remove adhering mud or soil. The seed boxes 7 are supported in any convenient manner at the front end of the frame and are arranged over shoes 8 running directly in front of the respective ground wheels 3 and connected with the seed boxes through seed tubes 9 whereby the seed may be directed into the furrow formed by the shoe. The dropper shaft 10 is journaled in the sides of the seed boxes and in the frame 1 and actuates mechanism of any approved type so that whenever the dropper shaft is rocked the seed to form a hill will be discharged through the tubes 9 and the shoes 8. The dropper shaft is held in its normal position by a torsion spring 11 coiled around the same and having its opposite ends secured, respectively, to the shaft and to the frame, as will be understood upon reference to Fig. 1. Fingers 12 are secured to the dropper shaft and these fingers are engaged by a trip device at regular intervals to rock the shaft against the tension of the spring 11, the rocking of the shaft in this manner effecting discharge of the seed. Loose upon the shaft between the fingers 12 is a sprocket 13 about which is trained a chain 14 which is given a definite length, usually forty-two inches, and each link is one inch long and may be marked with numerals beginning immediately adjacent the trip 15 carried by the chain and increasing in arithmetical progression rearwardly from the trip device along the upper run of the chain. The rear bight of the chain is carried by a sprocket 16 secured upon a counter-shaft 17 which is slidably and rotatably mounted in longitudinal slots 18 in a supplemental frame 19 and the main frame 1, as will be understood upon reference to Figs. 1 and 2. This counter-shaft 17 also carries a pinion 19' which is adapted to mesh with a gear 20 secured upon the axle 2 so that said gear will be rotated whenever the planter is in motion and the ground wheels 3, therefore, rotated. Fitted to the shaft 17 and spanning the sprocket 16 is a fork 21 carried by the front end of a link 22 which has its rear end pivoted to the lower end of a hand lever 23 fulcrumed upon a bracket 24 which is fixed to the frame 1 and provided with a rack 25 to be engaged by the usual latch on the hand lever so that the lever will be held in a set position. It will be readily understood that if the lever be rocked rearwardly the shaft 17 will be slid forward so that the pinion 19' will be moved out of mesh with the driving gear 20, and rocking of the lever in the opposite direction will cause the pinion to mesh with the gear so that the sprockets and the trip chain 14 will be actuated.

Carried by the ends of the dropper shaft 10 and the scraper rod 5 and extending longitudinally of the planter, on each side thereof, is a rail or guide bar 26 which should be at least as long as the trip chain and is marked with a scale of inches, as will be understood, the numerals of the scale increasing progressively from the front to the rear and being displayed on both sides of the bar so as to be readable from the driver's seat. Mounted upon the rail or guide bar 26 is a slide 27 which may conveniently be an open-ended loop fitting around the rail and having its outer side constructed with a sight opening, indicated at 28, an index or pointer 29 being formed at the center of the upper wall of said opening. Upon the slide 27 is secured a tapeline reel 30 housing a spring-controlled tape 31 and which may be of any well known construction. Suspended on the slide is a pointer rod 40 which depends to a point near the ground.

It will be understood that the trip chain 14 may be of any desired length and I prefer to make it forty-two inches long simply because hills of corn are generally planted in rows forty-two inches apart transversely of the field and by providing a chain of such length with a single trip device 15, the dropper shaft will be actuated at the proper intervals to plant the hills at the accepted distances apart. Of course, the chain could be longer and be equipped with a greater number of trip devices and it may be observed that the trip devices are cross bars firmly secured to the chain and having a central arched portion, as indicated at 32, whereby they may readily clear the teeth of the sprockets 13 and 16. The trip device projects laterally from the two sides of the chain so that the projecting ends will be carried against the fingers 12 on the dropper shaft and thereby rock the shaft to effect the dropping of the seed.

When the side or end of the field has been reached, the driver will note the distance the trip has traveled past the fingers on the dropper shaft and will slide the gage 27 rearwardly on the rail 26 the same distance that the trip has passed the fingers. The tapeline 31 is then drawn from the reel 30 at a right angle to the line which has been made by the marker. A mark of any kind, such as an imprint of the operator's shoe heel is then made in the ground on the guide mark and the tapeline permitted to recede into the reel casing. The shoes 8 are then lifted and the machine turned around and moved so that the shoes will be over the guide mark in front of the heel print which has just been made, the proper position being denoted by centering the rod 40 over the heel print. The trip 15 is then set the same distance from the fingers on the dropper shaft as the gage is distant from the front end of the rail or guide bar 26. The shaft 17 is then thrown in gear and the planter driven over the field as before. The first hill will then be dropped in alinement with the previously planted hills and subsequent plantings will be at the uniform distance of forty-two inches. It will be noted that I have provided an exceedingly simple and inexpensive mechanism which may be readily installed on any planter and by the use of which the check row wire stretching from side to side of the field will be rendered unnecessary.

Having thus described the invention, I claim:

In a check row planter, the combination with a planter frame, of a graduated rail secured on the side of the frame and extending longitudinally thereof, a slide loop fitted around the rail and having an open outer side, a pointer formed on the slide at the top of the open side thereof and overlapping the rail, a pointer rod suspended on the bottom of the slide in vertical alinement with the pointer, and a line mounted on the top of the slide in vertical alinement with the pointer.

In testimony whereof I affix my signature.

WILLIAM SCOTT. [L. S.]